(12) United States Patent
Gerashchenko (10) Patent No.: US 8,733,290 B2
(45) Date of Patent: May 27, 2014

(54) SYSTEM FOR PROVIDING AN INTERFACE FOR INTERACTING WITH A LABORATORY ANIMAL

(71) Applicant: Ludmila Gerashchenko, Brookline, MA (US)

(72) Inventor: Ludmila Gerashchenko, Brookline, MA (US)

( * ) Notice: Subject to any disclaimer, the term of this patent is extended or adjusted under 35 U.S.C. 154(b) by 0 days.

(21) Appl. No.: 13/742,403

(22) Filed: Jan. 16, 2013

(65) Prior Publication Data

US 2013/0255586 A1    Oct. 3, 2013

Related U.S. Application Data

(60) Provisional application No. 61/619,909, filed on Apr. 3, 2012.

(51) Int. Cl.
*A01K 1/03* (2006.01)

(52) U.S. Cl.
USPC .......................................... 119/421

(58) Field of Classification Search
USPC ......................... 119/421, 417, 418
See application file for complete search history.

(56) References Cited

U.S. PATENT DOCUMENTS

| | | | | |
|---|---|---|---|---|
| 5,816,256 A | * | 10/1998 | Kissinger et al. | 128/897 |
| 6,062,224 A | * | 5/2000 | Kissinger et al. | 128/897 |
| 6,279,511 B1 | * | 8/2001 | Loughnane | 119/769 |
| 6,837,184 B2 | * | 1/2005 | Gondhalekar et al. | 119/421 |
| 7,665,424 B2 | * | 2/2010 | Denault et al. | 119/792 |

OTHER PUBLICATIONS

Halassa M.M., Siegle J.H., Ritt J.T., Ting J.T., Feng G., Moore C.I., Selective optical drive of thalamic reticular nucleus generates thalamic bursts and cortical spindles, 2011, Nat. Neurosci. 14, 1118-1120.

Carter M.E., Yizhar O., Chikahisa S., Nguyen H., Adamantidis A., Nishino S., Deisseroth K., De Lecea L., Tuning arousal with optogenetic modulation of locus coeruleus neurons, 2010, Nat. Neurosci. 13, 1526-1533.

* cited by examiner

*Primary Examiner* — Yvonne Abbott
(74) *Attorney, Agent, or Firm* — Ilya Libenzon (57) ABSTRACT

A system for providing an interface for interacting with a laboratory animal and the method of using the system are disclosed.

20 Claims, 12 Drawing Sheets

SYSTEM FOR PROVIDING AN INTERFACE FOR INTERACTING WITH A LABORATORY ANIMAL

RELATED APPLICATION DATA

This application claims the priority of prior U.S. provisional application Ser. No. 61/619,909 filed Apr. 3, 2012, which is hereby incorporated by reference herein in its entirety.

TECHNICAL FIELD

Embodiments of the present invention relates generally to a system and related method for conducting research on animals, and more particularly to a system that provides an interface for interacting with a laboratory animal using laser light, fluids or electrical signals.

BACKGROUND ART

Animal use in scientific research is critical to understanding biomedical systems that lead to the development of useful drugs, therapies, and cures for diseases and pathologies. Mice are commonly used in biological research for many reasons: they are easily housed and maintained, they are relatively inexpensive, they reproduce quickly, their biological and behavior characteristics closely resemble those of humans, their various transgenic models are available, etc. Approximately 20-30 million mice are used each year in the United States for biological and medical research; mice are used in research much more than any other animals (Anft M. Of Mice and Medicine, 2008 Johns Hopkins Magazine, Vol. 60).

For many experiments, it is imperative that procedures are conducted using alert, freely moving mice. This is generally achieved using a tether, which allows fluids or electrical connections to be sampled or administered to the animal. However, tethers are often heavy for a small animal because they need to be sufficiently long to allow connections between the animal in the cage and a device located outside of the cage. To improve freedom of movement, a swivel or commutator is generally used to connect the animal and the infusion or sampling device. However, electrical commutators are a source of electrical noise that can lead to data artifacts, and fluid swivels are often problematical as they are often stiff and subject to leaks and blockages. Using telemetric devices and miniature pumps may eliminate the need for swivels in the system, but such devices restrict the animal's movement due to the effects of their weight (i.e., the smallest telemetry transmitter weighs ~4.6 grams or ~20% of the average mouse's body weight). Further, these devices are often implanted intraperitoneally (i.p.), which is considered a major surgery that could cause post-surgical complications and interfere with the results of the experiment. The present invention is therefore directed to developing a system that can provide a reliable interface for animals and permit a high level of activity.

At present, several prior art systems are commercially available to provide interface for laboratory animals. The following is a brief description of existing systems.

Tethering Systems for Recording EEG and EMG

Pinnacle Technology (Lawrence, Kans.) offers a tether system for electroencephalogram and electromyogram recordings in mice. In this system, a low-torque commutator is used to release tangled wires during the mouse movement. This system is similar to most handmade systems used in research laboratories. To minimize the pressure that wires can cause on the mouse, lightweight wires are needed. However, it is difficult to make such wires because they must be protected with a metallic spring or plastic cover to prevent mice from biting them. Therefore, some pressure on the mouse is expected in this type of system, and this pressure will change depending on the position of the mouse in the cage. Animal's mobility in this system also depends on the mechanical resistance of the electrical commutator in the system. A stiff commutator can significantly restrict animal's movement in this type of system.

Tethering Systems for Infusion Test Substances

Instech Solomon (Plymouth Meeting, Pa.) and Harvard Apparatus (Holliston, Mass.) offer polycarbonate cages designed to house tethered rodents during short-term infusion and microdialysis experiments. These cages are made in a circular shape to avoid the tangling of tethers, which is more likely in shoebox-type cages. These cages are frequently used with counter-balanced lever arms to reduce the pressure of the infusion line on the animal. The presence of counter-balanced lever arms may help to reduce weighted pressure on the animal by the tether, but it cannot eliminate it because the animal changes its position in the cage. This type of system is usually recommended for short-term infusions, although it can be also used for longer infusions. Similarly to any other traditional tethered system, this one restricts animal's movement to some degree, which mainly depends on the weight of the tether and stiffness of the commutator.

Telemetry Devices and Miniature Pumps

Currently, the smallest EEG/EMG telemetry transmitters are produced by Data Sciences International (DSI; St. Paul, Minn.). The F20-EET transmitter allows for the recording of 2 EEG channels and weighs about 4 grams. This is about 20% of the weight of an average mouse, and is likely to restrict the mouse's mobility.

Osmotic pumps weigh as little as 0.4 grams (Alzet osmotic pumps, Cupertino, Calif.). Such a lightweight device is not expected to significantly reduce the mouse's movement. However, osmotic pumps are typically implanted i.p. with infusion lines placed under the skin, which could be disturbing or stressful for the animal.

Fiber-Optic Connections with the Mouse

In recent years, optogenetics has become a very powerful tool for assessing the physiological effects of activation or inhibition of specific neuron types in animals. Many companies offer optogenetics hardware. Currently, however, there is no commercially available equipment that provides the capability of a fiberoptic interface in combination with an electro-encephalogram interface in freely moving animals. Some laboratories have designed their own systems for this purpose, but these systems are often bulky and restrict movement of a mouse. For example, stimulation of the thalamic reticular nucleus in vesicular gamma-aminobutyric acid transporter (VGAT)-channelrhodopsin-R2 (ChR2) mice produced state-dependent neocortical spindles (Halassa M. M., Siegle J. H., Ritt J. T., Ting J. T., Feng G., and Moore C. I. Selective optical drive of thalamic reticular nucleus generates thalamic bursts and cortical spindles, 2011, Nat. Neurosci. 14, 1118-1120), and stimulation of the locus coeruleus caused reversible behavioral arrests in ChR2-enhanced yellow florescent protein ((eYFP) mice (Carter M. E., Yizhar O., Chikahisa S., Nguyen H., Adamantidis A., Nishino S., Deisseroth K., and De Lecea L. Tuning arousal with optogenetic modulation of locus coeruleus neurons, 2010, Nat. Neurosci. 13, 1526-1533). Thus, some changes can be identified in mice whose locomotion is restricted by a large cable, but it could be difficult to observe subtle changes in behavior using such prior art systems.

SUMMARY OF THE EMBODIMENTS

According to one embodiment of the present invention, a system for providing an interface for interacting with a laboratory animal is disclosed. The system features a support member having a body and an opening in the body, the support member configured to attach to an animal cage, a first rotating member attached to the support member, the first rotating member having a first rotation axis and a rotation body concentric with and rotatable around the first rotation axis, an arm attached to the first rotating member and configured to rotate around the first rotation axis, at least one first device for coupling to and interacting with the laboratory animal, and a first cable coupled to the arm, the first cable passing through the first rotating member and the opening in the body of the support member and having a first end and a second end; wherein the first end is coupled to the at least one first device and a second end is configured for attaching to the laboratory animal. The first cable comprises at least one of an optical fiber, electrical wire, and infusion tube.

In a related set of embodiments, the first cable may be coupled to the arm by a container adapted for holding the at least one first device, and the container may be configured to rotate around a second rotation axis independent of the arm rotation. The system may further include a counterbalance weight attached to the container, the counterbalance weight may be adjustable to cause change in the weighted pressure of the cable on the animal. The container can be slidably attached to the arm. The arm can further include at least one blocking portion to partially restrict the motion of the container along the length of the arm and to prevent the first and/or second cable from wrapping around the arm. The arm can be an L-shaped arm. The system can further include a second cable passing through the first rotating member and through the opening in the body of the support member, and having a first end coupled to at least one second device and a second end adapted for coupling to the animal. The second cable may include at least one of an optical fiber, electrical wire, and infusion tube. The rotation of the container around the second axis may be limited to rotating by a pre-determined degree, thereby preventing the second cable from twisting and breaking. The system can further include a second rotating member splitting the second cable into a first portion and a second portion such that the second portion rotates independent of the first portion, thereby preventing the second cable from twisting and breaking; wherein the second rotating member is selected from the group consisting of a fiberoptic rotary joint, electrical commutator, and fluid swivel. The arm can be hollow inside and the first and/or second cable can be coupled to the arm by passing through the hollow arm.

A method for using a system for providing an interface for interacting with a laboratory animal is also disclosed. The method includes providing a laboratory animal implanted with electrode connectors, providing an animal cage, placing the animal into the animal cage, coupling a system to the animal cage by a support member, connecting at least one first device to a first end of a first cable, connecting a second end of a first cable to the animal via the electrode connectors, interacting with the animal; wherein the at least one first device can be an infusion pump, laser source, telemetry transmitter, biopotential monitoring device, or brain stimulating device.

In a related set of embodiments, the method can further include placing at least one first device into a container before or after connecting the at least one first device to the first end of the first cable. The method can further include connecting a first end of a second cable to at least one second device and connecting a second end of the second cable to the laboratory animal via the electrode connectors. The second device or devices can be an infusion pump, laser source, telemetry transmitter, biopotential monitoring device, or brain-stimulating device.

Other aspects, embodiments and features of the invention will become apparent from the following detailed description of the invention when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

The preceding summary, as well as the following detailed description of the invention, will be better understood when read in conjunction with the attached drawings. For the purpose of illustrating the invention, presently preferred embodiments are shown in the drawings. It should be understood, however, that the invention is not limited to the precise arrangements and instrumentalities shown.

DETAILED DESCRIPTION OF SPECIFIC EMBODIMENTS

Figure 1:
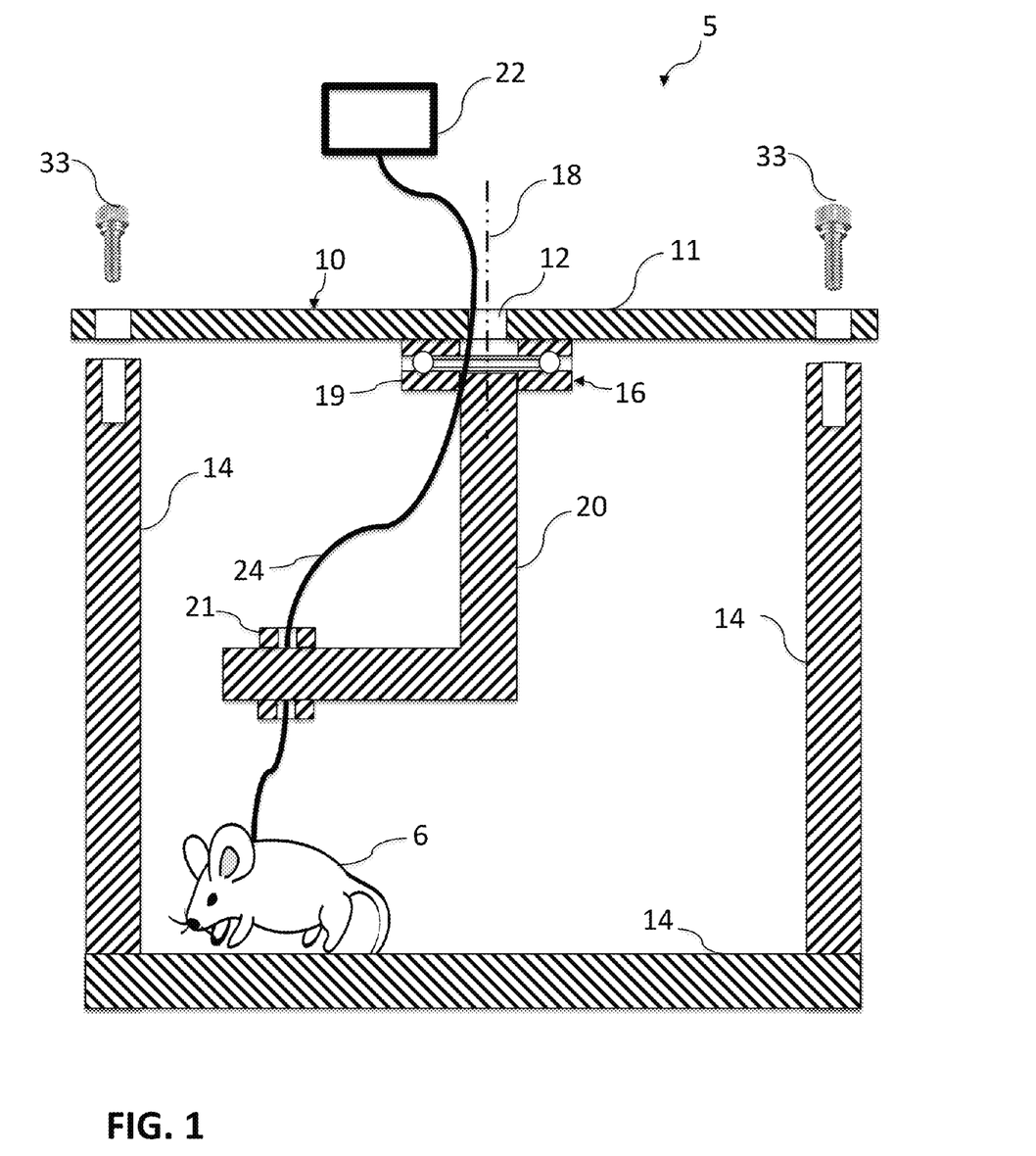
FIG. 1 is a cross-sectional view of the system according to an embodiment of the present invention.

FIG. 1 illustrates a system 5 for providing an interface for interacting with a laboratory animal 6 in accordance with one embodiment of the present invention. The system 5 includes a support member 10 having a body 11 and an opening 12 in the body, the support member 10 configured to attach to an animal cage 14. The system 5 includes a first rotating member 16 attached to the support member 10. The rotating member 16 comprises a first rotation axis 18 and a rotation body 19 concentric with and rotatable around the first rotation axis 18. The system 5 includes an arm 20 attached to the first rotating member 16 and configured to rotate around the first rotation axis 18, at least one first device 22 for coupling to and interacting with the laboratory animal 6, and a first cable 24 coupled to the arm 20. The first cable 24 passes through the rotating member 16 and the opening 12 in the body 11 of the support member 10 and has a first end and a second end; wherein the first end is coupled to the at least one first device 22 and a second end is configured for attaching to the laboratory animal 6. The first cable 24 comprises at least one of an optical fiber, electrical wire, and infusion tube. Thus, the first cable 24 can include, for example, an optical fiber and electrical wire, or an electrical wire and infusion tube, and so forth. The support member 10 can be attached to the animal cage 14 using attaching means 33, which can be screws, bolts, nails, or the like, as well as various attaching fixtures, glue, or any other suitable attaching mechanisms. The arm 20 can rotate around the first rotation axis 18 clockwise and counterclockwise. The first cable 24 is coupled to the arm 20 using attaching means 21, which can be any suitable attaching means such as various fasteners, including hook-and-loop fasteners, cable ties, tape, glue or the like. The first rotating member 16 can be a bearing, as shown in FIG. 1 for example, a swivel, rotary joint, or any other suitable rotating device.

Figure 2:
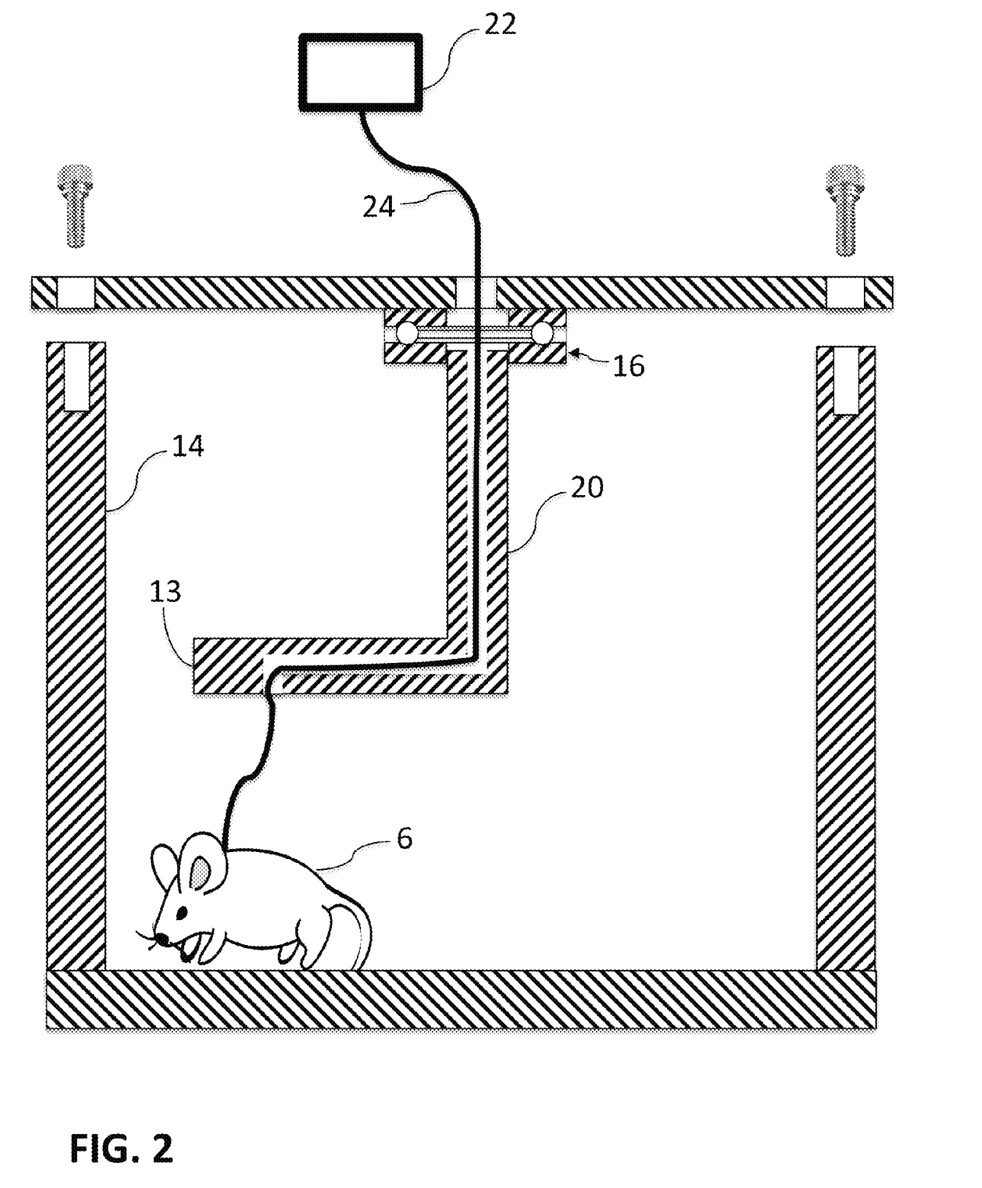
FIG. 2 is a cross-sectional view of the system featuring an arm with a hollow portion for receiving a cable according to one embodiment of the present invention.

According to another set of embodiments of the present invention, the arm 20 can be hollow inside and the first cable 24 is coupled to the arm 20 by passing therethrough as illustrated in FIG. 2. The hollow portion of the arm can terminate at some distance from a distal end 13 of the arm 20 (as shown in FIG. 2), or extend all the way to the distal end 13 of the arm 20 (not shown).

Figure 3:
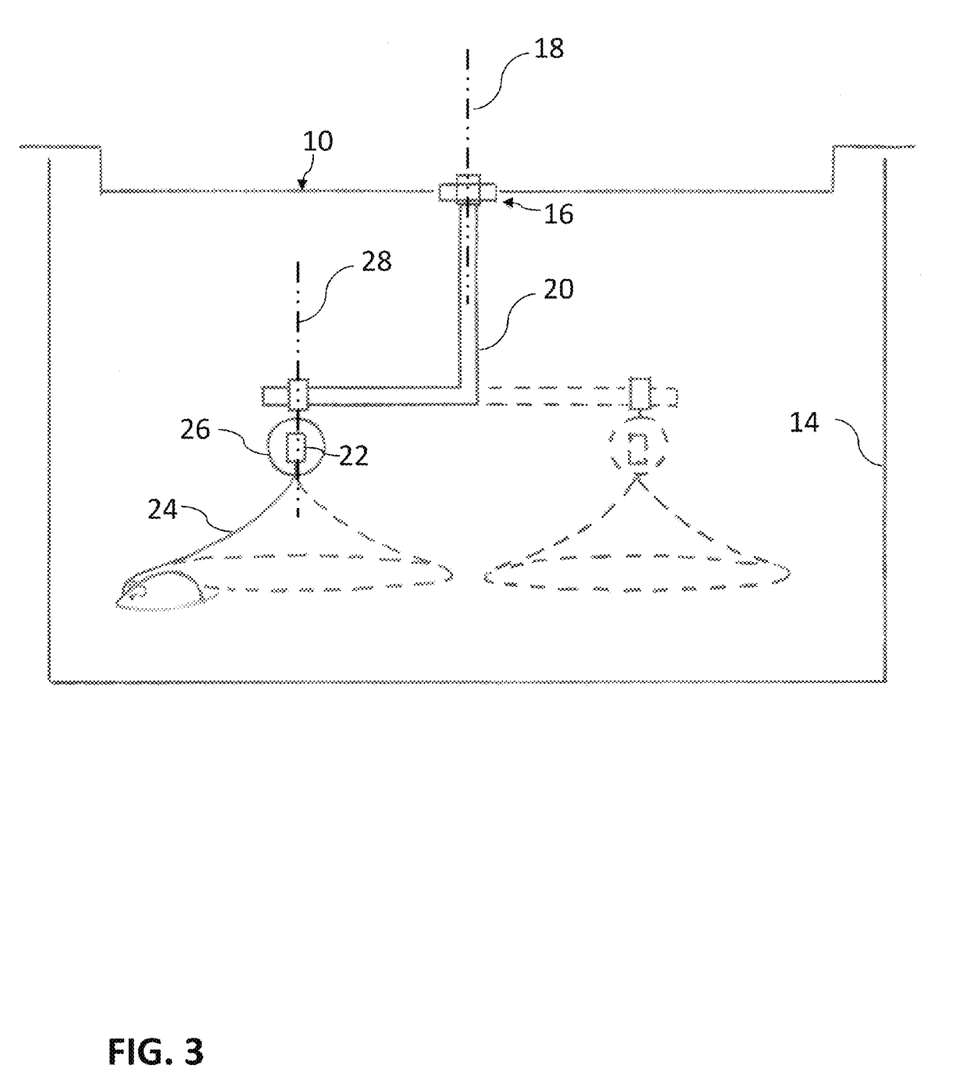
FIG. 3 is a schematic illustration of the system showing a container attached to an arm in accordance with an embodiment of the present invention.

Referring to FIG. 3, according to some embodiments of the present invention, the first cable 24 is coupled to the arm 20 by a container 26 adapted for holding the at least one first device 22. The container 26 is configured to rotate around a second rotation axis 28 independent of the arm rotation. The container 26 can be of any suitable shape, for example it can be spherical, or in the form of a cube, as long as it can receive and hold a device therein. It can be made of plastic or metal, or any other suitable material. The container 26 can comprise two parts that have to be taken apart in order to place the device inside (or can comprise two parts pivotally attached to each other); or alternatively, the container can include a window that has to be opened to place the device inside and then closed. The arm 20 can have any suitable shape and form. The arm 20 can be an L-shaped arm as shown in FIGS. 1-3, for example. The first rotation axis 18 can be parallel to the second rotation axis 28. The first axis and the second axis can be positioned at a certain angle in relation to each other.

Figure 4:
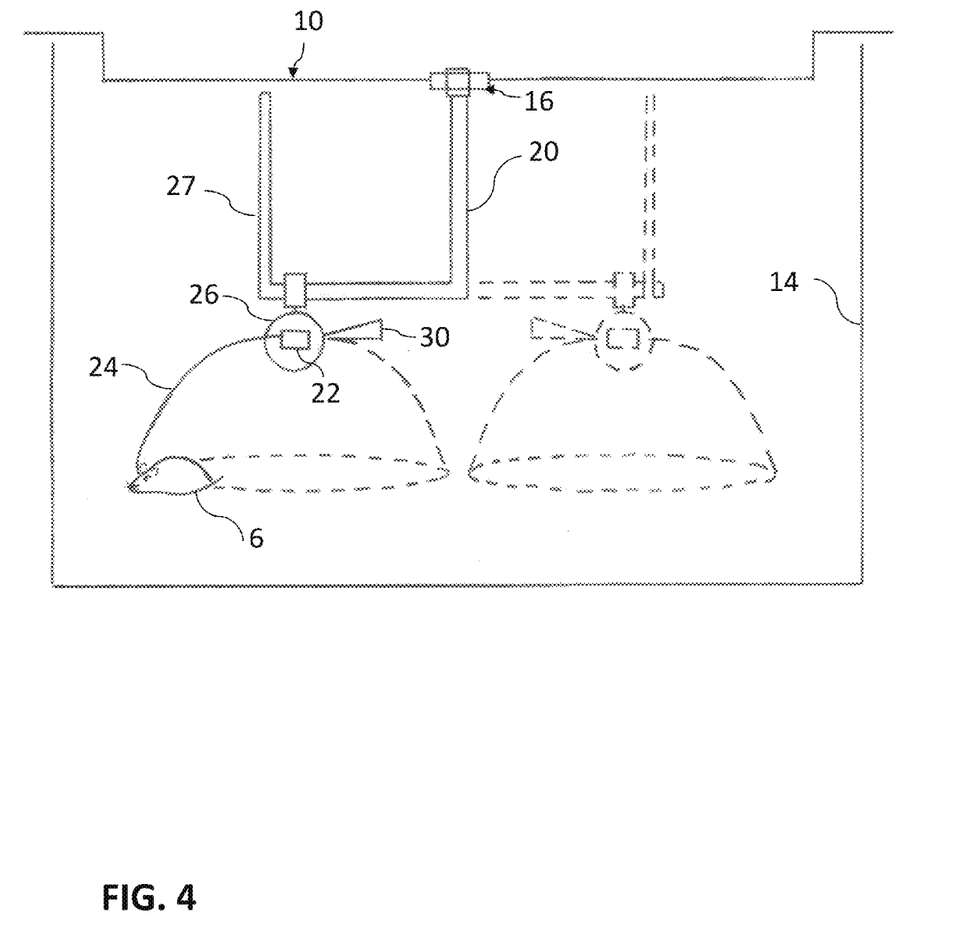
FIG. 4 is a schematic illustration of the system showing a container having a weight counterbalance in accordance with one embodiment of the present invention.

In some instances, as shown in FIG. 4, the system further includes a counterbalance weight 30 attached to the container 26, the counterbalance weight 30 is adjustable to cause change in the weighted pressure of the first cable 24 on the animal 6. The arm 20 can further include a blocking portion 27 to prevent the first cable 24 from accidently wrapping around the arm 20.

Figure 5:
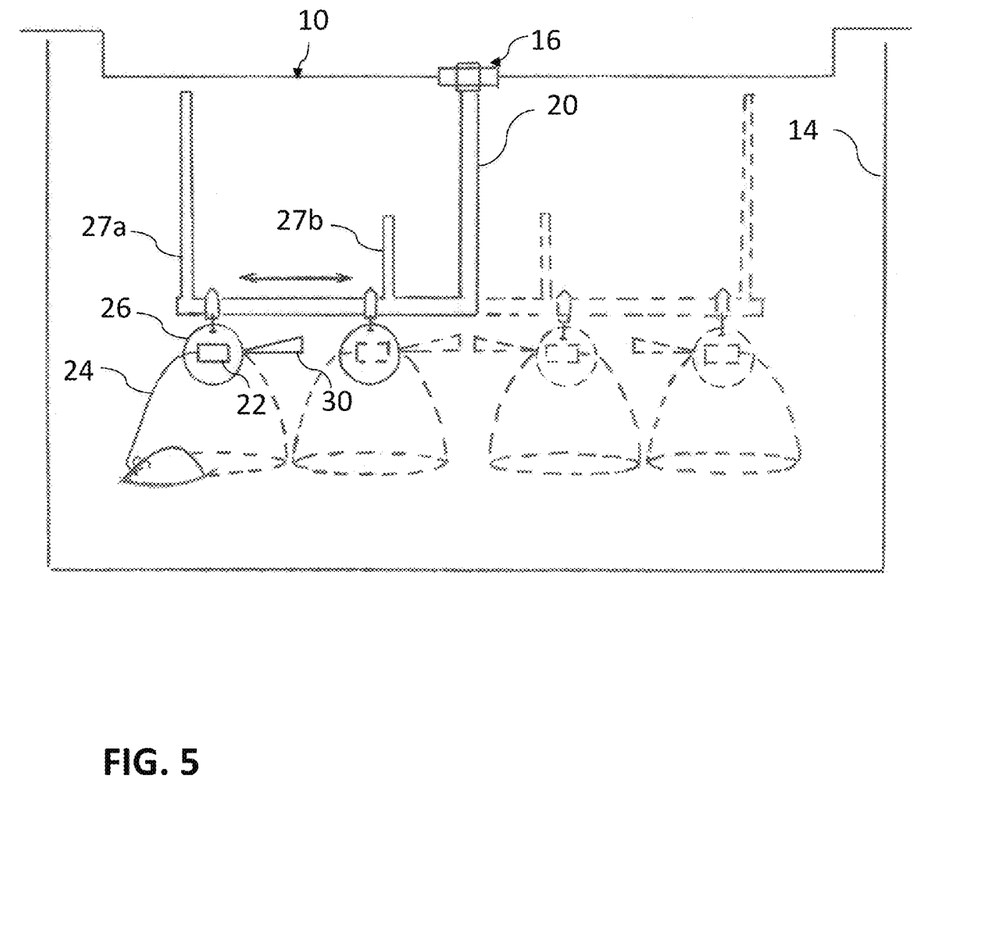
FIG. 5 is a schematic diagram showing a container slidably attached to the arm in accordance with another embodiment of the present invention.
Figure 6A:
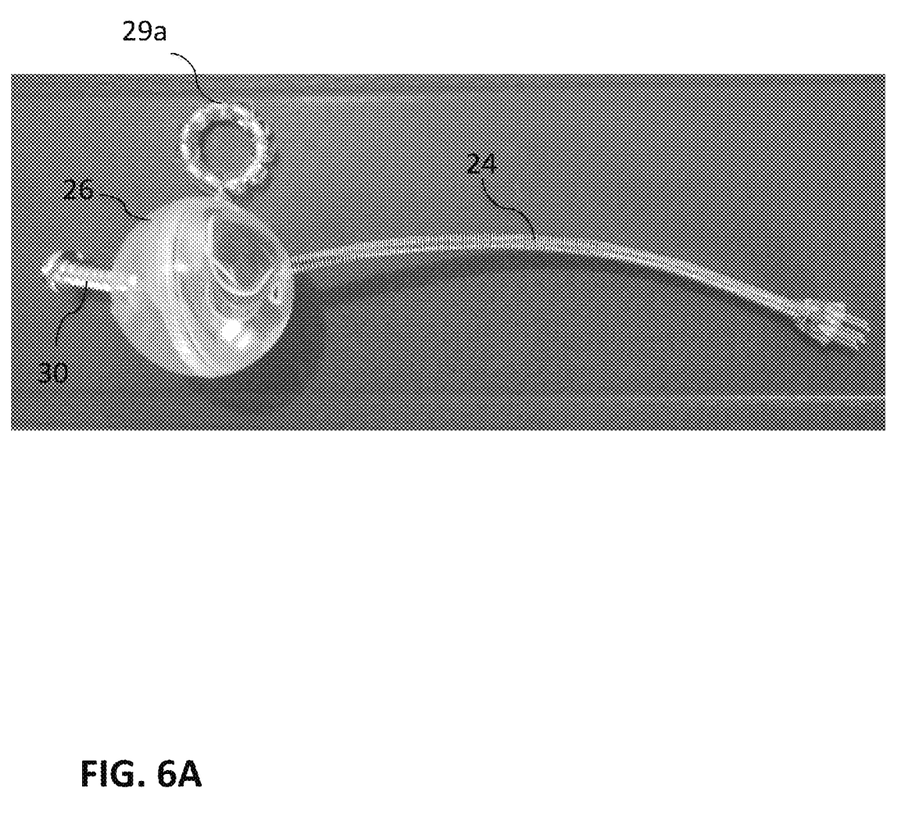
FIGS. 6A-6C are a schematic illustration of the container with various attaching means for attaching to an arm in accordance with embodiments of the present invention.
Figure 6B:
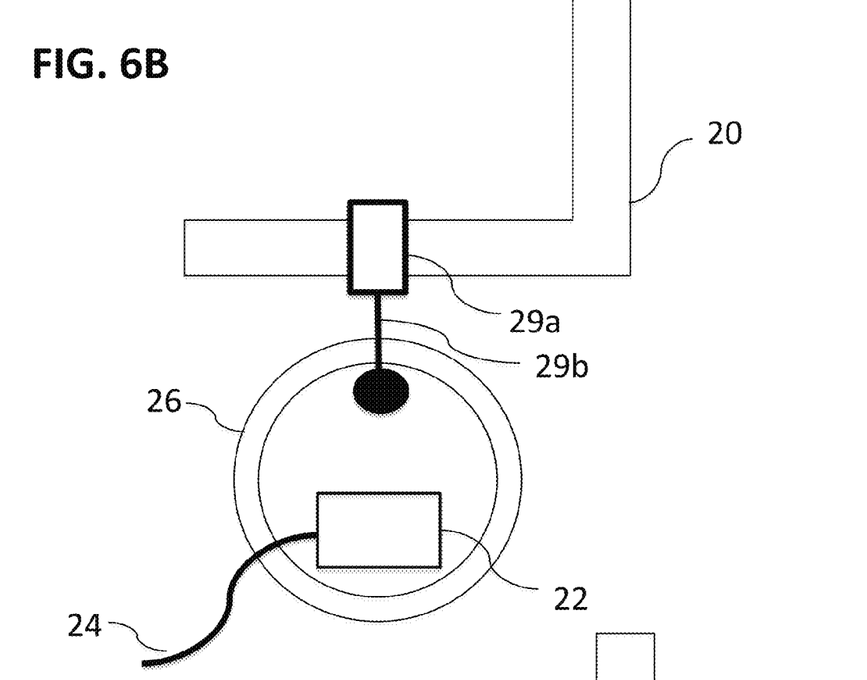
Figure 6C:
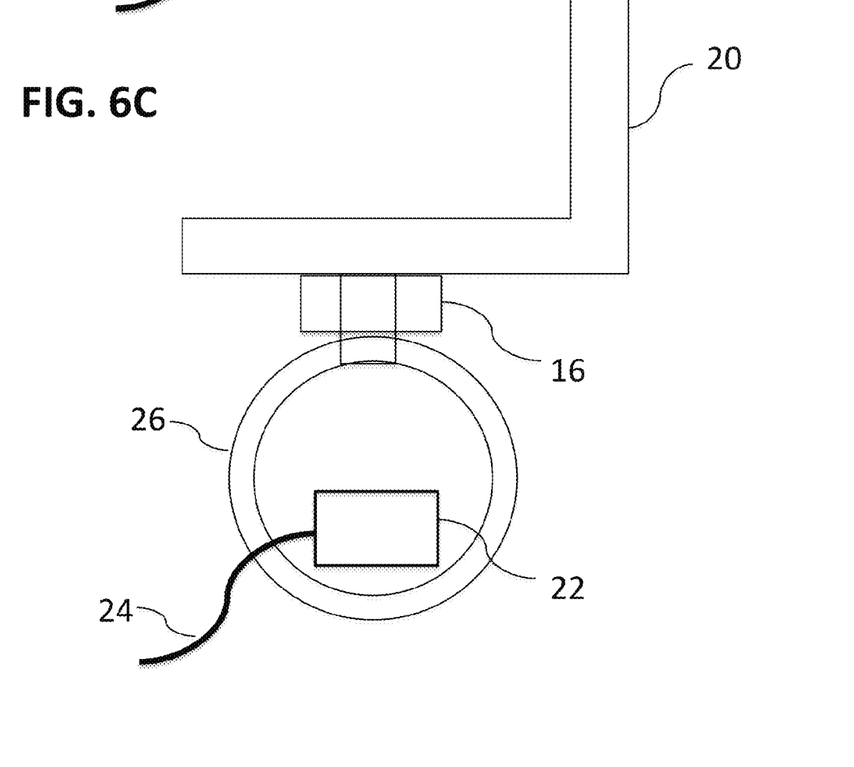

According to some embodiments, the container 26 can be slidably attached to the arm 20, as exemplary shown in FIG. 5, such that the container 26 can slide along the length of the arm 20. In some instances, the arm 20 can further include at least one blocking portion such as blocking portion 27a and blocking portion 27b, shown in FIG. 5, to partially limit the range of motion of the container 26 along the length of the arm 20 and to prevent the first cable 24 from wrapping around the arm 20. The container 26 can be attached to the arm 20 using attaching means such as an O-ring 29a shown in FIG. 6A, in combination with a swivel 29b as shown in FIG. 6B, or using a bearing 16 shown in FIG. 6C, for example.

Figure 7:
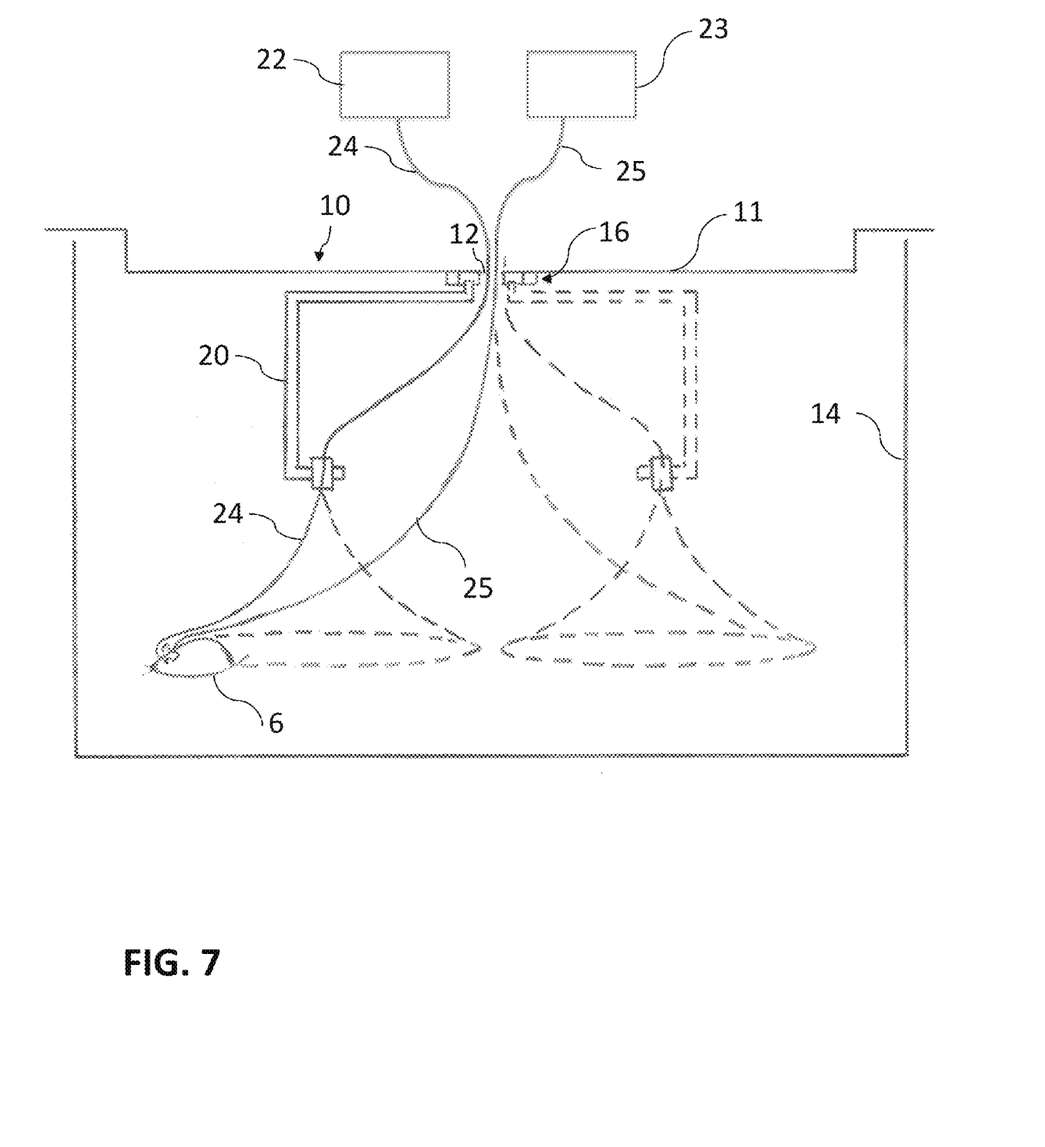
FIGS. 7-10 are a schematic illustration of different configurations of the system having two cables in accordance with embodiments of the present invention.
Figure 8:
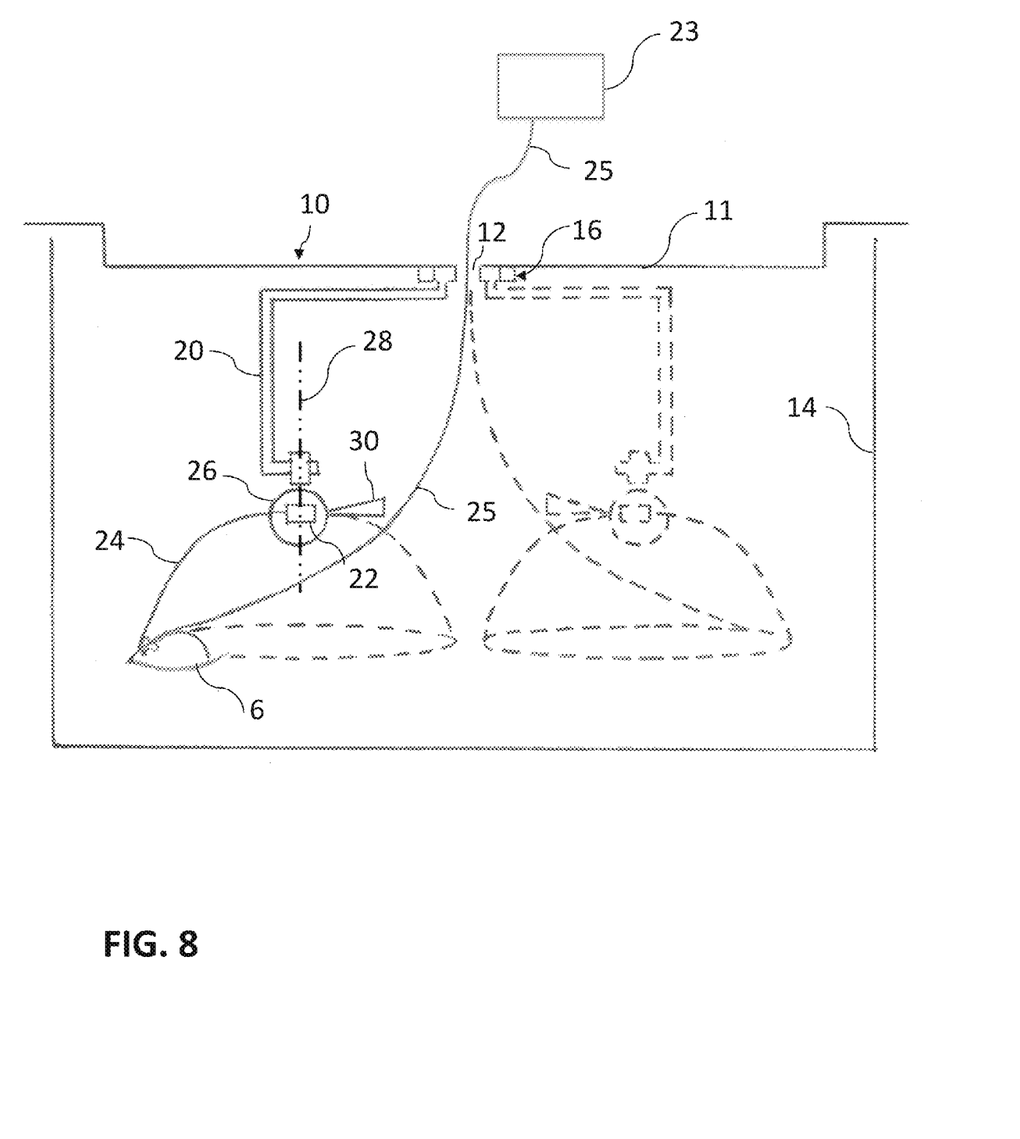

According to some embodiments of the present invention, as illustrated in FIGS. 7-8, the system may further include a second cable 25 passing through the first rotating member 16 and through the opening 12 in the body 11 of the support member 10, and having a first end coupled to at least one second device 23 and a second end adapted for coupling to the animal 6. The second cable 25 may include at least one of an optical fiber, electrical wire, and infusion tube. Referring to FIG. 8, the rotation of the container 26 around the second axis 28 may be limited to rotating by a pre-determined degree, thereby preventing the second cable 25 from twisting, which can lead to potential breaking of the second cable 25. For example, the container 26 can rotate 180 degrees about the second rotational axis 28, or 90 degrees about the second rotational axis 28, or can rotate any other suitable degrees about the axis 28 (e.g., 120, or 200, etc.). In some instances, the arm 20 can be hollow inside and the first cable 24, or the second cable 25, or both can be coupled to the arm 20 by passing through the hollow portion of the arm.

Figure 9:
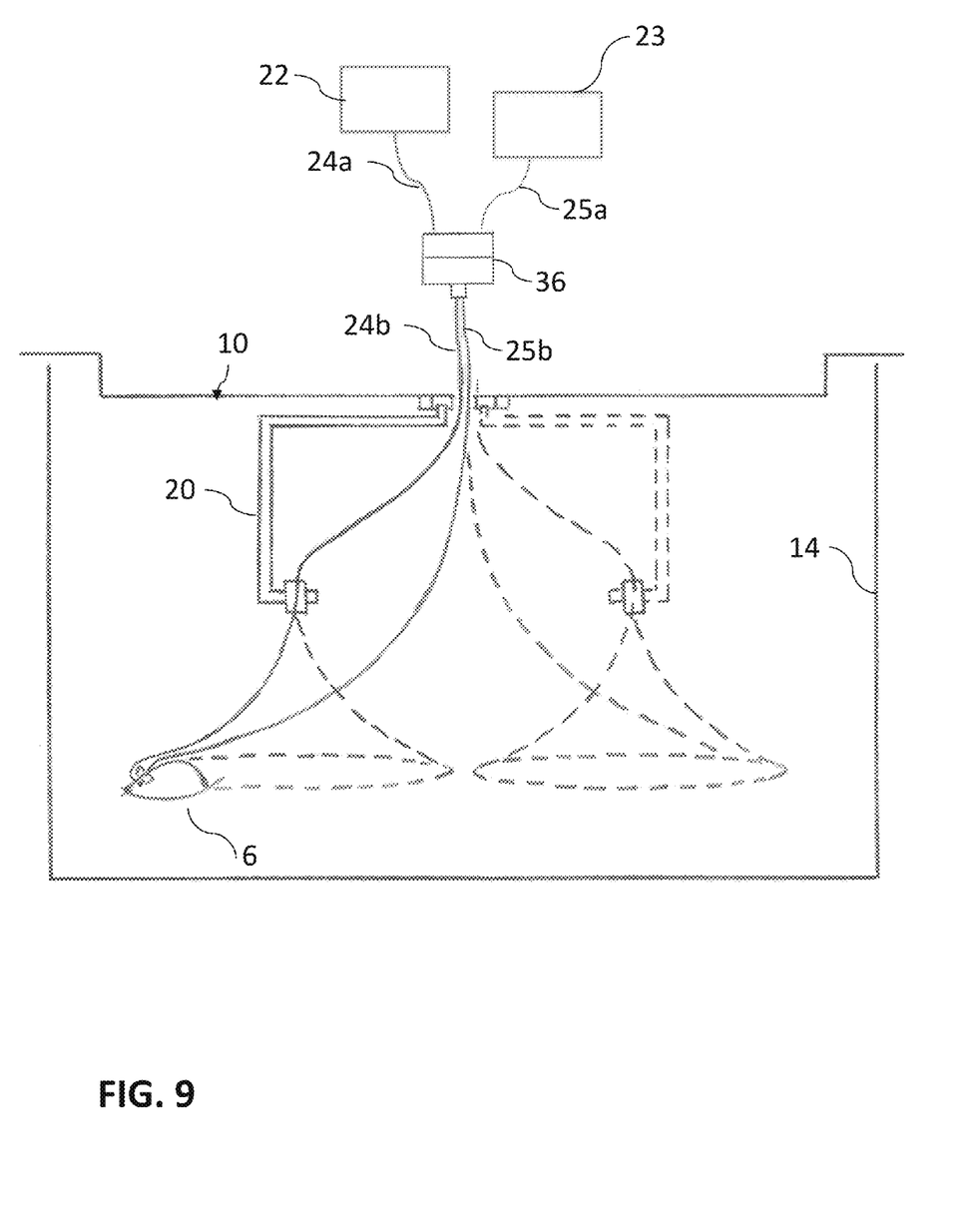

Referring to FIG. 9, according to another set of embodiments of the present invention, the system can further include a second rotating member 36 splitting the first cable 24 into a first portion 24a and second portion 24b and splitting the second cable 25 into a first portion 25a and second portion 25b such that, with regard to each cable, the second portion rotates independent of the first portion, thereby preventing the cables from twisting and breaking. The second rotating member can be a fiberoptic rotary joint, electrical commutator, or fluid swivel.

Figure 10:
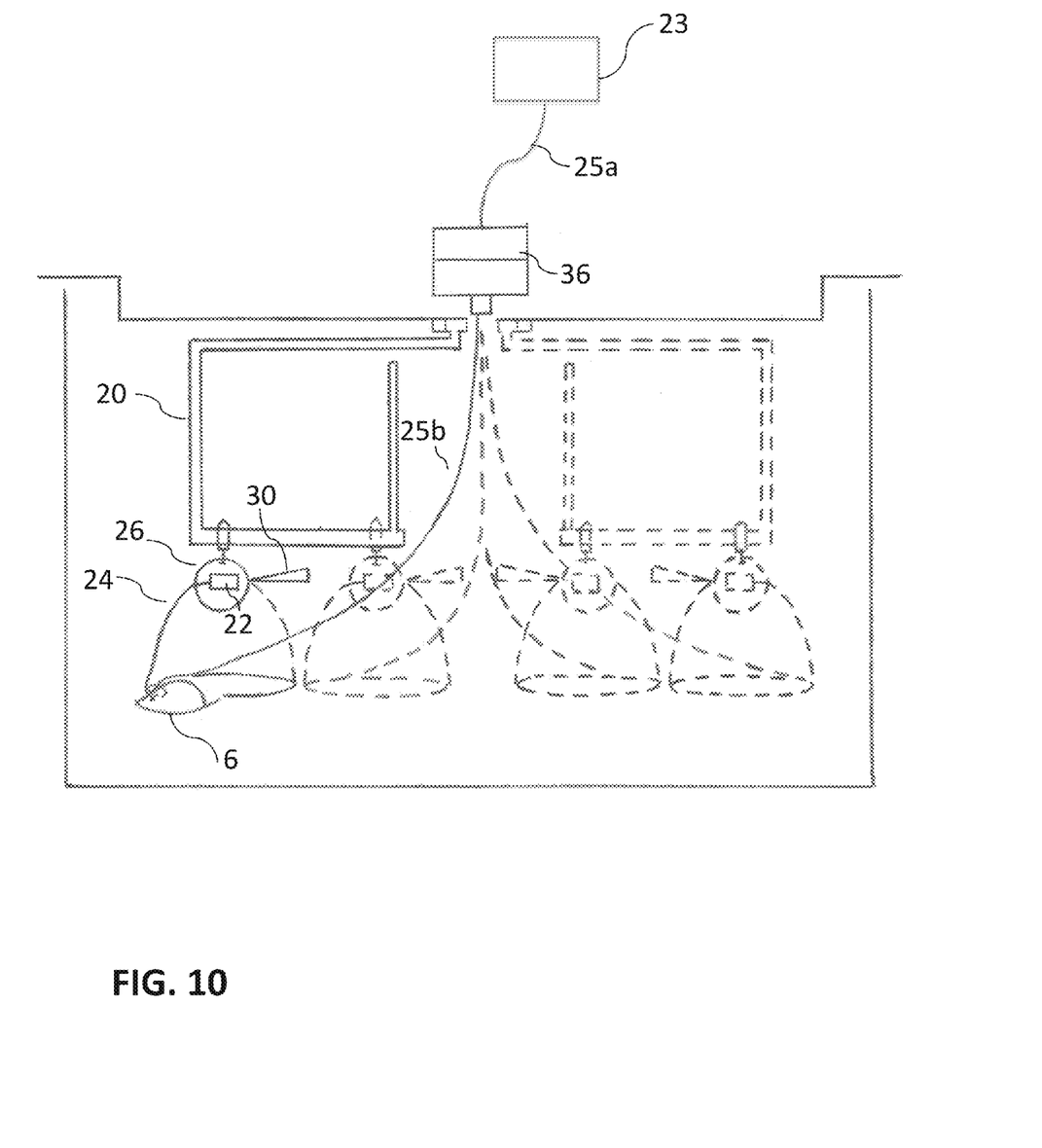

FIG. 10 illustrates another embodiment of the present invention, according to which, a second rotating member 36 splits the second cable into a first portion 25a and a second portion 25b such that the second portion rotates freely and independent of the first portion, thereby preventing the second cable from twisting and eventually breaking. The second rotating member 36 can be a fiberoptic rotary joint, electrical commutator, and fluid swivel.

The system of the present invention described above can be used for various applications, including recording of biosignals, stimulation of cells by light in optogenetics applications, measurement of blood flow using Doppler flowmetry, brain stimulation using electricity or ultrasound, as well as microdialysis and other collections of biological samples, delivery of drugs and other test substances, monitoring of animal activity and behavior, and the like.

Recording Biosignals

Figure 11:
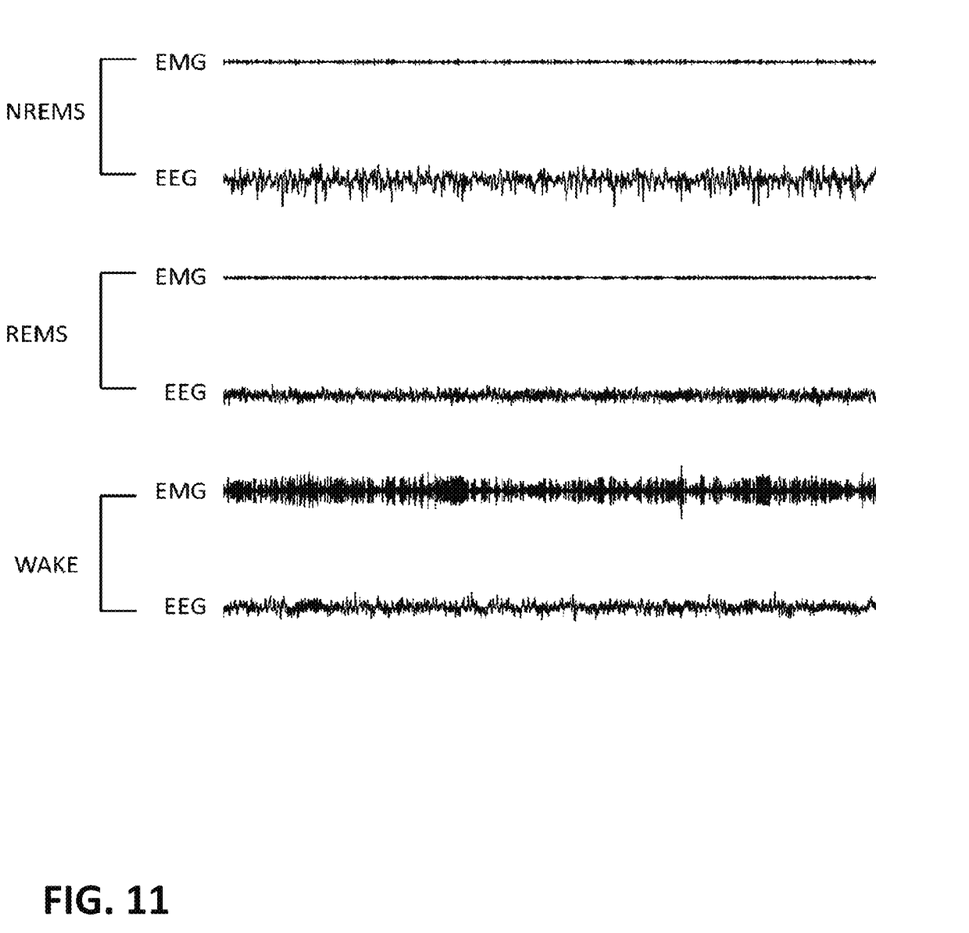
FIG. 11 is a graph showing laboratory animal's sleep recordings using the system in accordance with one embodiment of the present invention.

The system of the present invention can be used for recording a wide range of biosignals in animals. This includes recording electrical biosignals, such as electroencephalogram (EEG), magnetoencephalogram (MEG), galvanic skin response (GSR), electrocardiogram (ECG), electromyogram (EMG), electrooculogram (EOG), Heart Rate Variability (HRV), etc. To record electrical biosignals, an appropriate telemetry transmitter is placed into the container. Besides electrical biosignals, recording other types of biological signals can be performed by this system, if a telemetry transmitter for recording such signal is available. Moreover, a telemetry transmitter may not be needed if a signal is recorded by a device that fits into the container. For example, recording of body or brain temperature can be done using a miniature temperature logger with external sensor connected with the animal. This type of logger records temperature data into its internal memory, so that the data can be subsequently transferred to a computer. Other examples of biological signals that can be recorded by this system include continuous monitoring of tissue oxygen, breath rate, pulse distention, arterial pressure, left ventricular pressure, renal sympathetic nerve activity. Currently, there are many commercially available systems that allow such measurements using telemetry transmitters that are sufficiently small to fit in the container of system of the present invention. Data Sciences International (DSI) offers telemetry transmitters for recording EEG, EMG and temperature in both rats and mice. Both the mouse and rat transmitter are sufficiently small to be used in the system of the present invention. Millar Telemetry System offers telemetry transmitters for recording EEG, EMG, tissue oxygen, arterial pressure, left ventricular pressure, and renal sympathetic nerve activity. They use a telemetry transmitter that weighs 12-13 g and has volume of 7 ml. Such transmitter is also sufficiently small to be used in the system of the present invention. FIG. 11 shows sleep recordings in a mouse using the system of the present invention. The system allowed for making high-quality recordings, with no observable movement artifacts on the EEG, which is often seen in the tethered systems of prior art. A hallmark of accurate sleep analysis is the ability to have clear signals for sleep stage analysis and frequency analysis of the EEG signals. In fact, a big limitation in EEG power analysis occurs from movement artifacts that alter the amplitude of these signals that are typically analyzed by Fast Fourier transformation of the signal. The majority of these biopotential signal artifacts occur during wakefulness. However, movement artifacts also occur during non-rapid eye movement sleep (NREMS) and rapid eye movement sleep (REMS), and these mostly occur during transition points between sleep and wakefulness when animals jostle cables tethered to the animal or within the animal (such as often occurs in telemetry systems). Signal artifacts lead to more laborious sleep scoring and analysis and limit the number of epochs sampled providing less reliable results and potentially missing valuable data. The high-quality EEG signals recorded with the new system allows for enhanced data sampling and reduced EEG power variability.

Stimulation of Cells by Light in Optogenetics Applications

Optogenetics is the combination of genetics and optics to control well-defined events within specific cells of living tissue. It includes the discovery and insertion into cells of genes that confer light responsiveness; it also includes the associated technologies for delivering light deep into organisms as complex as freely moving mammals, for targeting light-sensitivity to cells of interest, and for assessing specific readouts, or effects, of this optical control. The system of the present invention provides such technology for delivering light into living organisms. If a container is present in the system, a telemetry transmitter, miniature pump or any other small device can be added to the container and used in combination with the optogenetics application.

Measurement of Blood Flow Using Doppler Flowmetry

Laser Doppler Flowmetry (LDF) is established as an effective and reliable method for the measurement of blood perfusion in the microvasculature because LDF provides continuous and real-time measurement capabilities. LDF offers substantial advantages over other methods in the measurement of microvascular blood perfusion. Studies have shown that it is both highly sensitive and responsive to local blood perfusion and is also versatile and easy to use for continuous subject monitoring. The system of the present invention can be used for blood flow measurements by LDF in freely moving animals. This can be done using the system of the present invention used for the optogenetics application. In this case, a laser will illuminate tissue through the optical fiber. Photons, scattered by the moving blood cells, will be spectrally broadened according to the Doppler effect and reflected back through the same optical fiber. This will allow measuring blood flow in the animal. Using this system, blood flow measurements and optogenetic stimulation could be done in the same animal if the wave length of light used for optogenetic stimulation is different from the wave length of light used by LDF.

Brain Stimulation Using Electricity or Ultrasound

Deep Brain Stimulation (DBS) as a therapy in neurological and psychiatric disorders is widely applied in the field of functional and stereotactic neurosurgery. In this respect, experimental DBS in animal models is performed to evaluate new indications and new technology. Experimental DBS in freely moving animals is an adequate tool to explore new indications for DBS and to refine DBS technology. Our system provides possibility for performing such type of studies in animals. A current generator could be placed into the container attached to the L-shaped rail and then connected to the animal. This will enable the performance of brain stimulation in the animals that can freely move in their home cage. Alternatively, electrical current can be delivered to the animal through electrical commutator. Such system of the present invention will also allow for high mobility of the animal during the stimulation.

Microdialysis and Other Collections of Biological Samples

The technique of microdialysis enables the monitoring of neurotransmitters and other molecules in interstitial tissue fluid. This method is widely used for sampling and quantifying neurotransmitters, neuropeptides, and hormones in the brain and periphery. Depending on the availability of an appropriate analytical assay, virtually any soluble molecule in the interstitial space fluid can be measured by microdialysis. In this method, the microdialysis probe is inserted into an external medium (i.e., tissue) and perfusion begins that allows substances on the outside surface of the dialysis membrane diffuse through the membrane into the probe along their concentration gradient. The perfusate is infused slowly and continuously through the length of the dialysis probe into the outflow tubing where it can be collected for subsequent quantification. In our system, the infusion can be achieved by placing a miniature pump into the container and connecting the pump with the microdialysis probe via the tubing located in the first cable. Alternatively, the pump can be placed outside of the animal cage and connected with the probe via the tubing in the second cable. The microdialysis sample can be collected through the outflow tubing located either in the first or second cable. Collection of biological samples by this method can be combined with electrophysiological recordings, brain stimulation, blood flow measurements, or other applications that require connections with the animal. Thus, our system provides convenient means for collection of biological samples in freely moving animals in various studies.

Delivery of Drugs and Other Test Substances

Our system can be used for delivering a drug to an animal. This will require an indwelling cannula attached to the animal on one end and an infusion pump on another end. Similar to the method of collecting biological samples, delivery of drugs can be achieved by placing the infusion tubing within either the first or second cable. This method can allow both bolus injections and continuous infusions into the animal.

Monitoring of Animal Activity and Behavior

Measurements of rodent locomotion, such as moving pattern, activity count, active time, travel distance, speed, and rearing, are an essential part of many behavioral studies. Our system can be used to perform such measurements. To perform the measurements, a telemetry transponder designed for detection of locomotor activity is placed into the container that is connected with the animal via the first cable. Because the transponder is constantly connected with the animal via the cable, movement of the animal is reflected by the transponder movement. Therefore, it is possible to measure locomotor activity of the animal and to identify whether the animal treatment has psychomotor effects.

Using the System in Animals Larger or Smaller than Mice

The system of the present invention is particularly useful for studies with small laboratory animals such as mice or hamsters. However, there are some studies in which larger animals might be preferred. In these cases, the system can be easily modified to allow recording in a larger animal. The modification will require a stronger first cable and a stronger arm that would withstand the force of a larger animal. Thus, the system of the present invention provides for the first time a relatively inexpensive and reliable means of interface for interacting with a laboratory animal of various sizes using laser light, fluids or electrical signals.

Therefore, there is provided a system that is easy to use, fits standardized laboratory cages, allows for more consistent generation of data due to reduced data artifacts and less stress induced on the animals, provides the ability for more normal activity patterns to be conducted by the animals, allows for better utilization of automated scoring due to improved biopotential signal recordings, and improves the reliability and accuracy of drug and optogenetics stimuli generation.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A system for providing an interface for interacting with a laboratory animal, comprising:
    a support member having a body and an opening in the body, the support member configured to attach to an animal cage;
    a first rotating member attached to the support member, the rotating member comprising a first rotation axis and a rotation body concentric with and rotatable around the first rotation axis;
    an arm attached to the first rotating member and configured to rotate around the first rotation axis;
    at least one first device for coupling to and interacting with the laboratory animal; and
    a first cable coupled to the arm, the first cable passing through the rotating member and the opening in the body of the support member and having a first end and a second end; wherein the first end is coupled to the at least one first device and a second end is configured for attaching to the laboratory animal;
    wherein the first cable comprising at least one of an optical fiber, electrical wire, and infusion tube.

2. A system according to claim 1, wherein the first cable is coupled to the arm by a container adapted for holding the at least one first device; the container configured to rotate around a second rotation axis independent of the arm rotation.

3. A system according to claim 2, further comprising a counterbalance weight attached to the container, the counterbalance weight is adjustable to cause change in the weighted pressure of the first cable on the animal.

4. A system according to claim 2, wherein the container is slidably attached to the arm.

5. A system according to claim 4, wherein the arm further comprises at least one blocking portion to partially limit the motion of the container along the length of the arm.

6. A system according to claim 2, further comprising a second cable passing through the first rotating member and through the opening in the body of the support member, and having a first end coupled to at least one second device and a second end adapted for coupling to the animal; wherein the second cable comprising at least one of an optical fiber, electrical wire, and infusion tube.

7. A system according to claim 6, wherein the rotation of the container around the second axis is limited to rotating by a pre-determined degree, thereby preventing the second cable from twisting and breaking.

8. A system according to claim 6, further comprising a second rotating member splitting the second cable into a first portion and a second portion such that the second portion rotates freely and independent of the first portion, thereby preventing the second cable from twisting and breaking; wherein the second rotating member is selected from the group consisting of a fiberoptic rotary joint, electrical commutator, and fluid swivel.

9. A system according to claim 6, wherein the arm is hollow inside and the second cable is coupled to the arm by passing through the hollow arm.

10. A system according to claim 1, wherein the arm has an L-shape.

11. A system according to claim 1, further comprising a second cable passing through the first rotating member and through the opening in the body of the support member, and having a first end coupled to at least one second device and a second end adapted for coupling to the animal; wherein the second cable comprising at least one of an optical fiber, electrical wire, and infusion tube.

12. A system according to claim 11, further comprising at least one second rotating member splitting at least one of the first cable and the second cable into a first portion and a second portion such that the second portion rotates independent of the first portion, thereby preventing at least one of the first cable and the second cable from twisting and breaking; wherein the at least one second rotating member is selected from the group consisting of a fiberoptic rotary joint, electrical commutator, and fluid swivel.

13. A system according to claim 11, wherein the arm is hollow inside and at least one of the first cable and the second cable is coupled to the arm by passing through the hollow arm.

14. A system according to claim 1, wherein the arm is hollow inside and the first cable is coupled to the arm by passing therethrough.

15. A system according to claim 1, further comprising a second rotating member splitting the first cable into a first portion and a second portion such that the second portion rotates freely and independent of the first portion, thereby preventing the first cable from twisting and breaking; wherein the second rotating member is selected from the group consisting of a fiberoptic rotary joint, electrical commutator, and fluid swivel.

16. A system according to claim 1, wherein the arm further comprises a blocking portion to prevent the first cable from wrapping around the arm.

17. A method for using a system for providing an interface for interacting with a laboratory animal according to claim 1, the method comprising:
    providing a laboratory animal implanted with electrode connectors;
    providing an animal cage;
    placing the animal into the animal cage;
    coupling a system to the animal cage by a support member;
    connecting at least one first device to a first end of a first cable;
    connecting a second end of a first cable to the animal via the electrode connectors; and interacting with the animal;
wherein the at least one first device is selected from the group consisting of an infusion pump, laser source, telemetry transmitter, biopotential monitoring device, and brain stimulating device.

18. A method according to claim 17, further comprising placing at least one first device into a container before or after connecting the at least one first device to the first end of the first cable.

19. A method according to claim 18, further comprising connecting a first end of a second cable to at least one second device and connecting a second end of the second cable to the laboratory animal via the electrode connectors; wherein the at least one second device is selected from the group consisting of an infusion pump, laser source, telemetry transmitter, biopotential monitoring device, and brain stimulating device.

20. A method according to claim 17, further comprising connecting a first end of a second cable to at least one second device and connecting a second end of the second cable to the laboratory animal via the electrode connectors; wherein the at least one second device is selected from the group consisting of an infusion pump, laser source, telemetry transmitter, biopotential monitoring device, and brain stimulating device.

* * * * *